H. P. MOLANDER.
WAVE MOTOR.
APPLICATION FILED FEB. 21, 1910. RENEWED DEC. 14, 1910.

982,186. Patented Jan. 17, 1911.

Witnesses
J. Milton Jester
Anna M. Murray

Inventor
Hans P. Molander
By Shepherd Campbell
Attorneys

UNITED STATES PATENT OFFICE.

HANS P. MOLANDER, OF SAN DIEGO, CALIFORNIA.

WAVE-MOTOR.

982,186. Specification of Letters Patent. Patented Jan. 17, 1911.

Application filed February 21, 1910, Serial No. 544,993. Renewed December 14, 1910. Serial No. 597,361.

*To all whom it may concern:*

Be it known that I, HANS P. MOLANDER, a citizen of the United States of America, residing at San Diego, in the county of San Diego and State of California, have invented certain new and useful Improvements in Wave-Motors, of which the following is a specification.

This invention relates to wave motors and has for its object to provide an improved device of this character adapted to convert power derived from the motion of the ocean's waves into continuous rotary motion in one direction.

Figure 1:
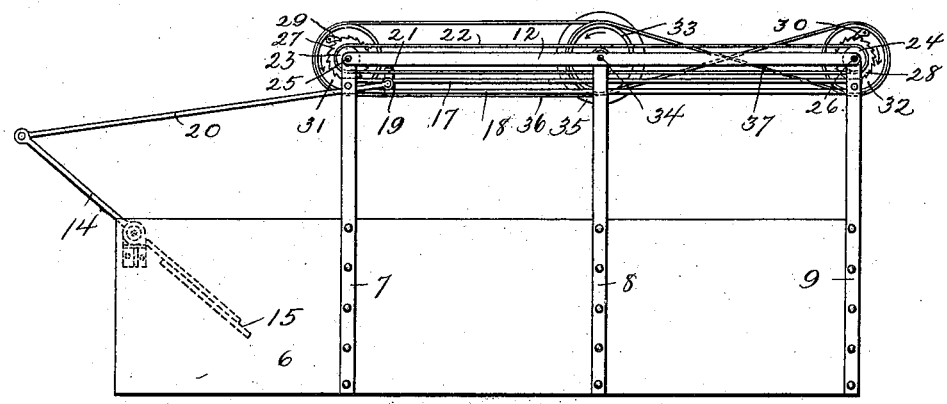
Figure 2:
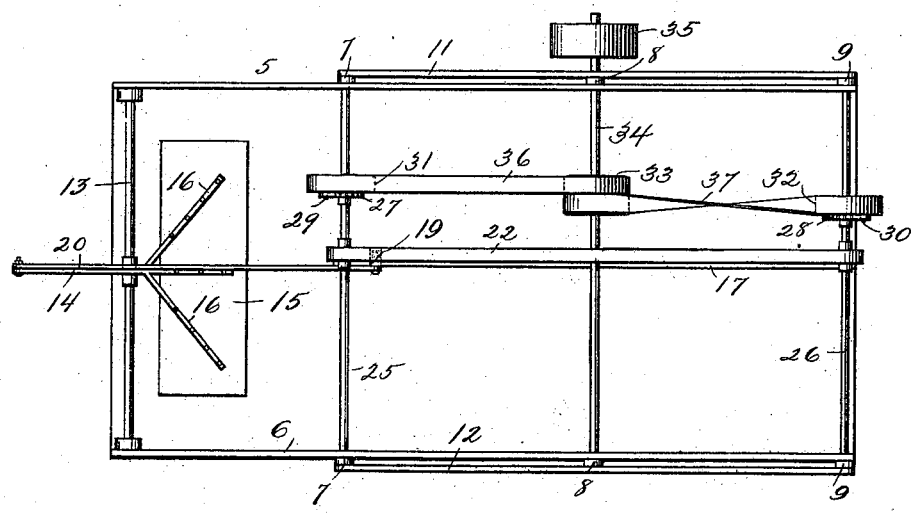

Further objects and advantages of the invention will be set forth in the detailed description which now follows:

In the accompanying drawing, Figure 1 is a side elevation of a wave motor constructed in accordance with the invention, and, Fig. 2 is a plan view thereof.

Like numerals designate corresponding parts in both of the figures of the drawing.

Referring to the drawing, the numerals 5 and 6 designate side base members from which uprights 7, 8, and 9 extend. Horizontal braces 11 and 12 complete a supporting frame. The detail construction of this supporting frame is unimportant. It may be made of light galvanized metal or it may be made of heavier wooden pieces so long as it provides a sufficient support and bearing for the elements hereinafter described. Journaled in the side base members 5 and 6, is a shaft 13 that carries a lever 14. A paddle 15 is secured to the lower end of this lever, said lever comprising the braces 16 to afford a firm support to the paddle. A guide way is formed between bars 17 and 18, and a cross head 19 is slidably disposed in this guide way. This cross head is connected by a connecting rod 20 to the upper end of the lever 14, it being understood that the lever 20 is pivotally connected both with the lever 14 and the cross head 19.

It is apparent, therefore, that when the structure herein described is placed upon the shore of a body of water and in such position that the incoming and outgoing waves can act upon the paddle 6, to impart a back and forth movement to the lever 14, said back and forth movement will be transmitted to the cross head 19 through the connecting rod 20. The cross head is connected at 21 to a belt 22. This belt passes over pulleys 23 and 24, said pulleys being fast upon shafts 25 and 26 and these shafts will be alternately rotated in opposite directions by the movement of the belt 22. Ratchet wheels 27 and 28 are fast upon the shafts 25 and 26, and engage pawls 29 and 30 of pulleys 31 and 32 in such manner that the alternate rotation in opposite directions of the shafts 25 and 26 results in an intermittent application of power, in one direction only, to the pulleys 31 and 32. A wide pulley 33 is mounted upon a shaft 34, said shaft carrying a balance wheel or driving pulley 35. A straight belt 36 passes over the pulley 31 and the pulley 33, and a crossed belt 37 passes over the pulley 33 and the pulley 32, whereby the pulley 33, shaft 34, and balance wheel or driving pulley 35 will have continuous movement in one direction imparted thereto, as will be readily understood.

The present construction embodies a very simple and efficient mechanism for deriving continuous rotary movement from the motion of waves. The parts employed are few and inexpensive and consequently the machine will not easily get out of order. While the elements shown and described are well adapted to serve the purposes for which they are intended, it is to be understood that the invention is not limited to the precise construction set forth, but includes within its purview such changes as may be made within the scope of the appended claims.

Having described my invention, what I claim is:

1. The combination with a supporting frame, of a pair of spaced shafts, pulleys carried thereby, a belt passing over said pulleys, a pivoted paddle, a connection between said paddle and said belt for imparting a back and forth movement to said belt, a rotative member, and means for converting the back and forth movement of said belt into continuous rotary movement of said member.

2. The combination with a supporting frame, of a pair of spaced shafts, pulleys carried thereby, a belt passing over said pulleys, a pivoted paddle, a connection between said paddle and said belt for imparting a back and forth movement to said belt, a rotative member, and means for converting the back and forth movement of said belt into continuous rotary movement of said member, said means comprising a pair of pulleys mounted upon said shafts, pawl and ratchet connections between said shafts and said pulleys, a straight belt passing from one of said pulleys over said rotative member, and a crossed belt passing from the other of said pulleys over said rotative member.

3. The combination with a supporting frame, of a lever pivoted intermediate its ends upon said frame, a paddle carried by the lower end of said lever, a guide way carried by the frame, a cross head slidably disposed in said guide way, a connecting rod pivotally connected to said cross head and to the upper end of said lever, a pair of spaced shafts, pulleys carried by said shafts, an endless belt passing over said pulleys, said belt being connected to said cross head, a ratchet wheel mounted upon each of said shafts, a pawl carrying pulley loosely mounted upon each of said shafts, a pawl carried by each of said pulleys and engaging the corresponding ratchet wheel, a shaft disposed between the first named shafts, a rotative member mounted thereon, a straight belt passing over said rotative member and over one of the pawl carrying pulleys, and a crossed belt passing over said rotative member and the other of said pawl carrying pulleys.

In testimony whereof I affix my signature in presence of two witnesses.

HANS P. MOLANDER.

Witnesses:
H. M. VOLLMER,
J. C. HIZAR.